United States Patent Office 3,073,704
Patented Jan. 15, 1963

3,073,704
EGG FOOD PRODUCTS AND PROCESSES
FOR PREPARING SAME
Eugene J. Rivoche, Washington, D.C., assignor to Rivark Research and Development Corporation, a corporation of Indiana
No Drawing. Filed Nov. 9, 1960, Ser. No. 68,147
18 Claims. (Cl. 99—196)

This invention relates to egg food products such as egg patties, omelets, soufflés and other egg-base foods and to processes for their preparation. In accordance with the invention, products of this type are made readily available for marketing in premixed form. The products in one aspect of the invention are packaged in frozen portion form for distribution to the consumer in the usual manner for frozen foods. The products may also be distributed in bulk form, in cans or cartons, either frozen or unfrozen.

An object of the invention is to provide novel egg food products which require only heating prior to serving.

Another object of the invention is to provide a method whereby eggs may be premixed with solid food particles and stored for useage without separation of the mixture during storage.

Another object of the invention is to provide egg mixes that can be preserved by canning or freezing and can be conveniently readied for serving with a minimum of effort.

Another object of the invention is to provide egg-base food products that can be frozen for storage and which do not lose the flavor characteristics of raw eggs.

Another object of the invention is to provide in an egg food mixture a cooking medium which improves the cooking characteristics of patties, omelets and the like, made from such products.

Another object of the invention is to provide egg-base mixtures which can be utilized in ready-to-serve, portion controlled manner.

The objects of this invention, in general, are accomplished by process steps which involve one or more of the following operations:

(1) The thickening of at least a portion of a raw egg mass by heating to a thick, creamy consistency whereby particles of other food materials may be homogeneously dispersed therein without substantial settling or separation.

(2) The addition of cold, raw eggs to the heated mass for cooling purposes to prevent further congealing of the heated eggs and to add the flavor and binding characteristics of raw eggs.

(3) The admixture of a solution of a non-ionic alkyl ether of cellulose in milk or water to a raw egg mass or to an egg mass prepared by steps (1) or (2) above, to provide further binding characteristics and improved cooking properties.

(4) The addition of other food particles to the egg mass prepared by any one or any combination of steps (1) to (3), either before or after chilling the egg mass to stiffen it so as to prevent the settling or separation of the added particles.

(5) The freezing of the products from any one of steps (1) to (4) either in bulk, in molds, or after processing through a patty-making machine.

In my Patents Nos. 2,798,814 and 2,887,382, I have described the preparation of frozen food products from food particles by the use of methyl cellulose solutions. The present novel food products wherein methyl cellulose solutions are utilized have all of the advantages of those set forth in my aforementioned patents but are distinguished therefrom by reason of the use of a raw egg-base material. The admixture of methyl cellulose solution with solid food particles to provide homogeneity is readily accomplished. However, when raw eggs are mixed with methyl cellulose solution, the mixture is less viscous than the methyl cellulose solution alone, and added food particles tend to separate one standing. Thus, different layers of food materials may form in the container or mold. Further, when solid materials such as chopped meats, vegetables and the like are added to a raw egg mass without methyl cellulose solution, it is difficult to prevent settling or separation of such particles while individual portions are being prepared for freezing or use. The present invention provides improvements in processing whereby such separation is avoided. Thus, the invention with advantage utilizes the operation described above wherein all or a portion of the raw egg mass is thickened prior to being mixed with other ingredients, and/or the additional feature described in (4) above wherein the egg mass is stiffened by chilling prior to or after the addition and mixing in of the methyl cellulose solution and other food particles. The addition of viscous methyl cellulose solutions also provides a considerable thickening of the mass which helps keep the particles in suspension and provides a desirable cooking and binding medium.

The process in one aspect comprises the steps of mixing raw eggs with from about 10 to about 100% by weight of a fluid, aqueous or milk solution of a non-ionic edible alkyl ether of cellulose having the property of forming a thermally reversible gel upon heating, converting such mixture to a semi-solid condition by subjecting it to a curing stage at chilling temperature (about 45 to 50° F. to freezing, i.e. about 32° F.), mixing the chilled mass, then packing the semisolid mass into molds, cans or other containers and freezing it therein in hard, frozen form, or passing it to a patty-making machine. The molded material may be removed from the molds and cut into slices of desired thickness while still hard frozen. The individual frozen portions are packed in cartons for sale in frozen food departments of grocery stores or for distribution to restaurant or institutional trade. The product packed in cans may be distributed without cutting into slices or individual pieces, and the consumer may permit the product to thaw and then dip it out of the can by means of a scoop or the like for dropping onto a heated surface or into deep fat. Unless completely warmed to room temperature, there is little difficulty with segregation of the product into layers at this stage. If any segregation does occur, the mass may be stirred without difficulty to insure homogeneity for a sufficient time for use. Freezing of a product containing methyl cellulose solution has been found to increase the strength of the resulting gel from such solution. Any desired shape of product may be obtained, since the surface on contact with the heating medium forms a crust with the methyl cellulose solution and thereby prevents loss of shape.

The cellulose ethers contemplated by the invention are defined as water-soluble, non-ionic alkyl ethers of cellulose having the property of forming heat-reversible gels in solution. These cellulose ethers include ethyl cellulose, methyl cellulose, methylethyl cellulose, hydroxypropyl methyl cellulose, and hydroxyethyl cellulose. Ionic cellulose ethers such as carboxymethyl cellulose, carboxymethyl hydroxyethyl cellulose and their salts, which do not have the property of forming gels in aqueous solution upon heating, are excluded by this definition. Unlike solution of other gel-forming materials such as gelatin, alginates, pectinates and the like, which provide harder gels as their temperature is lowered, solutions of the alkyl cellulose ethers contemplated by the invention remain fluid until frozen and do not begin gel formation until heated.

The cellulose methyl ethers marketed under the name of "Methocel" are suitable for the purposes of this invention. Chemically, "Methocel" is a long chain cellulose polymer having a methoxyl content of about 27.5 to 32%. The HG, or high gel grade of Methocel, is, chemically, a mixed hydroxypropyl methyl ether of cellulose. HG-65 indicates a high gel grade of methyl cellulose having a gelation temperature of 65° C. in 2% aqueous solution. HG-70, HG-90, etc., also indicates the temperature at which gelation or hardening begins. These non-ionic cellulose ethers will be generally referred to hereinafter as methyl cellulose.

Methyl cellulose products are commercially available in various grades, ranging in viscosity from 10 to 15,000 centipoises in 2% water solution at 68° F. Different viscosity grades may be used with different types of the egg food products. It is possible to mix the various commercially available viscosity grades to obtain a specific desired viscosity. One skilled in the art, guided by the information herein, may readily determine the best grade and type of methyl cellulose for a particular type of food product and for a particular processing operation.

The concentration of methyl cellulose solution utilized for the purposes of the present invention may be varied as desired between about 1 and about 8%, depending to some extent upon the quantity of the solution utilized with the egg food product. While the quantity of methyl cellulose solution can be varied between, for example, about 10 to about 100% by weight, above about 50% by weight, in general provides no advantage and it is preferred to use between about 20 to about 30% by weight with respect to the weight of the eggs in the mixture. With such quantity of solution, a concentration of about 4% of methyl cellulose has been found to be satisfactory. Higher concentrations may be used with lesser amounts of solution with respect to eggs, and the lower concentrations can be used with higher quantities. Higher quantities of methyl cellulose solution are preferred with higher proportions of raw to precooked eggs. The proportion of methyl cellulose solution may be designated a minor proportion with respect to the quantity of egg mass.

It has been mentioned above that the methyl cellulose solution can be a solution of methyl cellulose in either water or milk. Where the latter is used, the methyl cellulose may be placed in liquid milk solution, either whole or skim, in the same manner that solutions are formed with water. Thus, the desired quantity of methyl cellulose powder may be dispersed in hot milk and the dispersion then placed in solution by the addition of ice or frozen milk. Advantageously, however, the methyl cellulose powder is first mixed with dry milk solids, which may be either of skim milk, whole milk or whey. A mixture of dry milk solids with methyl cellulose powder goes almost instantaneously into solution in cold water. Thus, a milk-methyl cellulose solution may be readily prepared by dissolving a mixture of dry milk solids and methyl cellulose in sufficient cold water to reconstitute the milk solids. Where methyl cellulose is added in milk solution to the egg product, the additional advantage of the nutritional properties of the milk is added to the product.

An advantageous method of adding milk-methyl cellulose mixture to an egg mass is to first mix precooked eggs with a portion of chilled, raw eggs and cold water or ice for immediate cooling of the heated eggs. Milk-methyl cellulose powder is then added and goes into solution by reason of the water available from the coolant. The quantity of water or ice is that which would be required to provide a milk-methyl cellulose solution of a desired concentration, e.g., the same concentration as would be used if the solution were separately prepared.

After the methyl cellulose solution, either in water or milk, has been mixed with the egg base, the mass is chilled in a cold room or run through a chilling unit of the continuous type wherein rapid chilling with constant stirring is attained. The temperature of the mass is reduced until the desired thickness preventing segregation is attained. The mass may be semi-frozen or near the freezing stage. Such chilling unit may be similar to those used for making ice cream by continuous methods. A suitable machine is that of the votator type. Batch type machines may be utilized provided sufficient stirring is accomplished to prevent segregation of the liquids until the mass is converted to semisolid form. Alternatively, in a batch operation the mass is chilled under static conditions to a semisolid state, then thoroughly stirred prior to placing in the mold to insure maintenance of homogeneity. The chilling involves no loss of heat economy where the mass is to be hard-frozen eventually. Where solid food additives are to be incorporated, they may be introduced after the mass has reached a semisolid consistency, so that such particles remain suspended in the mass. However, such solids may be added initially to the liquid mass. The semifrozen or semisolid mass may then be placed into molds or casings, and such molds or casings are then placed in a quick-freezing chamber where they are hard-frozen for subsequent slicing and packaging. Alternatively, individual pieces of portion size may be molded and frozen separately.

A preferred method of processing a raw egg mass comprises partially precooking at least a portion of the egg mass while constantly stirring so as to provide a semisolid mass of a viscous, semigel-like consistency characterized by the property that after being broken up by stirring, it recombines to its original smooth, homogeneous, viscous, semigel-like state. In the description and claims hereinafter, this state will be referred to by the words "thick, creamy consistency." Overcooking or reducing the egg mass to a consistency of scrambled eggs is avoided, as overcooked or scrambled eggs lose their viscous character and become brittle, having the tendency to break up while stirring and substantially losing the binding characteristic of eggs and the flavor of raw eggs. The heating may conveniently be accomplished in a continuous type of heat-exchange device similar to the chilling unit previously mentioned, but utilizing a heating medium in the jacket. The temperature of this operation may range from about 100 to about 180° F., depending upon the equipment used. With good agitation and careful control, a temperature of about 174° F. plus or minus 5°, has been found to be quite satisfactory.

Such precooked mass may be mixed with a further portion of cold, raw eggs, if desired, and with or without further addition of methyl cellulose solution. The resulting mass, if sufficiently thick, remains in homogeneous admixture during the molding and freezing operation. The precooking step may be combined with the step of chilling under agitation and the subsequent hard-freezing operation to insure a very stable, homogeneous food product which does not break up during subsequent cooking. The adding of cold, raw eggs to the partially precooked creamy egg mass provides a supplementary binding element and a more flavorable, juicier and tastier product is obtained. Even without admixing with methyl cellulose solution, a satisfactory product can be obtained with these steps.

It will be observed that two different types of products are produced from raw fluid eggs, one type employing only the eggs themselves with or without other food additives, and the other type employing methyl cellulose solution as a further cooking and binding medium. The latter type of product has the advantage of providing better control of cooking and thus a greater variation of other food materials may be added. Thus, a cooked product of any desired consistency of softness and juiciness can readily be obtained through the use of methyl cellulose solution, whereas very little control can be obtained with egg albumen as the only binding agent. The use of methyl cellulose solution in the egg product is especially advantageous when other additives are utilized in raw or partially precooked condition, because the presence of methyl cellulose solution then provides the necessary cooking medium for the added food materials. Without the use of Methocel, the egg mass will cook much faster than added raw food particles such as particles of liver, ham, bacon, vegetables or the like. Without the presence of methyl cellulose solution, the egg mass would burn or be reduced to an unacceptable mass before the added products if in raw form are cooked or even sufficiently warmed up. The use of raw or only partially precooked food additives in the egg mass cause the finally cooked product to be much better from the standpoint of flavor and quality than if completely cooked additives are used. The latter can be utilized, of course, when it is desired to produce a product without the use of methyl cellulose solution.

The invention is more fully illustrated by the following examples of practice:

EXAMPLE 1

A quantity of cold, fresh raw eggs is stirred to form a homogeneous liquid mass. About three-quarters of the egg mass is then preheated while stirring until it has been transformed into a thick, viscous, creamy consistency resembling incompletely scrambled egg. Precautions are taken to insure that the eggs are not fully cooked or scrambled to the point where the mass become brittle and would break down into small, individual particles when, stirred, with no tendency to adhere together. As soon as the egg mass has been transformed to this consistency, the heating is immediately stopped. The other one-quarter of the raw egg mass is now mixed into the preheated mass of eggs with the result that further cooking is immediately stopped. This combination produces a well-flavored and juicy patty, the raw egg serving as a binder to hold the patty together during the further cooking either before or after freezing. The mixture can be molded and frozen to patty form or other food products can first be mixed in if desired. Such food products may comprise particles of ham, mixed vegetables and chicken livers, or the like which preferably have been precooked substantially to a ready-to-eat condition. Preferably, the mass is then chilled to a point near its freezing temperature to harden the mixture and insure that a homogeneous distribution and suspension of the food ingredients is maintained during subsequent molding and freezing steps. If the chilling is conducted in a batch operation rather than by a continuous process, the mass is stirred prior to molding or freezing. The product is then molded into desired shapes and frozen, ready for packaging.

EXAMPLE 2

A raw egg mass which has been stirred to provide a homogeneous mixture is partially hardened by heating to a temperature of 155 to 175° F. while constantly stirring. The mass, in thick, creamy form, is then cooled immediately by indirect heat exchange with a cooling medium so that further cooking is avoided. The resulting mass is molded and frozen for cutting into portions, or is further chilled to such consistency that patties may be formed directly. Minor amounts of other food particles, by preference precooked, may be mixed with the chilled mass prior to patty formation or molding.

EXAMPLE 3

A raw egg mass which has been stirred to provide a homogeneous mixture is partially hardened by precooking at a temperature of about 150 to 180° F. while constantly stirring. When the egg mass is reduced to a semisolid, viscous, creamy consistency, it is then cooled and mixed with from about 25 to 30% by weight of methyl cellulose solution (in milk or water, as preferred) of approximately 4% concentration, 4,000 to 7,000 cps. viscosity range. The resulting mass can be either directly placed in molds and quick-frozen for slicing in patty form, or may be first reduced by chilling to a thickened state for patty formation or molding and freezing.

EXAMPLE 4

A mass of cold, raw eggs is reduced to a homogeneous state by stirring, and about 65% by weight of such mass (or other desired proportion) is then partially precooked at a temperature of about 174° F. while constantly stirring, as in Example 1. The remaining portion of the eggs is now added to the partially precooked portion and intimately admixed therewith. This operation produces a more flavorable and juicy egg patty than that of Examples 2 and 3. The egg mixture, which includes partially precooked and raw eggs, then is mixed with from about 20 to 30% by weight of methyl cellulose in solution in milk or water. The resulting mass is chilled to semisolid or semifrozen state while being agitated so as to avoid segregation of the liquids and is then placed in molds, hard-frozen and sliced, as before. The addition of the fresh, cold egg mass to the partially precooked egg mass cools the latter to such an extent that methyl cellulose solution can be added directly without further chilling and immediately stops the further cooking of the warmed portion of the eggs.

In either of the foregoing Examples 3 and 4, the egg mass may be mixed with other food particles such as, for example, with mixed vegetables to provide a western omelet type patty, tomato substances if a creole type is to be produced, or with cheese cubes or cheese powder to provide a cheese-egg product. Particles of chicken livers, ham or any other food particles may be added to obtain a corresponding egg-chicken liver product, egg-ham product, or the like. These particles may be added either after or prior to the precooking or chilling stages. Preferably, however, they are added in raw, chopped form after the egg mass has been converted to semisolid form. This provides a more flavorable product. The methyl cellulose solution provides a satisfactory cooking medium, enabling the raw or partially precooked foods to be eventually cooked without burning the eggs.

EXAMPLE 5

*Western Omelet Patties*

50 lbs. raw egg (to be cooked)
50 lbs. ham-vegetable mix (chopped or minced)
25 lbs. raw eggs
3.5 lbs. dry premix of dry milk-Methocel product (10 parts by weight dry milk powder to 4 parts by weight methyl cellulose—½ HG–65, 4,000 cps. and ½ U.S.P.–8,000 cps.)
22.5 lbs. water The 50-pound batch of eggs is warmed up while stirring until reduced to a viscous, semisticky mass at a temperature of about 155 to 180° F. The 22½ pounds of water are added to the 25 pounds of raw eggs and mixed therewith. This mixture is then added to the warmed up egg mass and thoroughly mixed with same for cooling purposes. The 3.5 pounds of dry milk-Methocel premix are added to the entire mixture and thoroughly mixed to reconstitute the milk solids and place the Methocel in solution. The resulting mixture is then chilled to about 4° C. to provide a stiff, thick mass. The ham-vegetable mixture is then added and intimately dispersed in the chilled mass. This product is then molded, frozen and cut into portion-controlled patties for distribution.

Alternatively, prior to chilling the mixture of eggs, water and milk-Methocel, the ham-vegetable mixture may be mixed in and the whole mass chilled and molded. After chilling and molding, and before freezing, the material may be given a further stirring, for better distribution of the particles. The water may be added to the eggs in the form of crushed ice to provide a better cooling effect. The raw eggs may also be precooled.

EXAMPLE 6

A western omelet mix having the same composition as set forth in Example 5 was prepared, but instead of being molded and frozen and cut into patties, was placed in cans for immediate distribution and use. Patties of this mix were formed using a spatula and a 2-ounce ice cream scoop. The cooking time for these nonfrozen patties was about one-half the time for the cooking of the frozen patties of Example 5. Both types of patties, however, had excellent appearance and taste. The cooking time in each instance was less than about five minutes. The canned product may be preserved in frozen form and thawed out prior to using.

In any of the foregoing examples, it will be understood that seasonings such as sugar, salt, spices or other flavorings can be added, to taste. The gel-forming characteristics of methyl cellulose are not affected by such substances. Further, in the egg products, shortening may be added, e.g., from 2 to 5% or more of melted butter or margarine. For a fluffy type of product, baking soda, sodium or ammonium bicarbonate, and/or water-soluble caseinates can be added to the food mass in a cold stage, prior to freezing.

In any of the foregoing examples, the homogeneous, rather viscous mass resulting from the incorporation of methyl cellulose may be cooked directly without the freezing operation providing it has not been allowed to stand long enough to separate into layers or to permit any solids present to settle. Thus, the product may be stored for a short time in bulk in an unfrozen condition. Portions of the unfrozen mass or previously frozen and thawed mass may be scooped out with an ordinary ice cream scoop or the like and dropped upon a hot cooking surface or into deep fat with or without previous shaping. Upon contact with the heating medium, the product thereafter holds its shape. In the event that separation or settling does occur within the bulk container prior to use of any or all of the material, it may be restirred to provide homogeneity for the period of use.

Even though the methyl cellulose solution forms a heat-reversible gel, the products of the invention remain in shaped form and do not break up upon cooking and subsequent cooling because evaporation of the moisture during cooking concentrates the methyl cellulose solution so that it acts as a binder even when cooled.

It will be readily apparent to those skilled in the art that many variations of the process and many food combinations and additives may be employed. For example, suitable egg products may also be made by utilizing heat and homogenizing to provide a smooth, creamy egg mass. Thus, a portion of the egg mass may be procooked to the stage of scrambled eggs and homogenized, preferably with a portion of raw eggs to add binding and flavor characteristics.

This application is a continuation-in-part of my application Serial No. 21,103, filed April 11, 1960, now abandoned.

I claim:

1. A method for the preparation of an egg food product adapted to be cooked without substantial loss of shape during cooking, comprising partially congealing a mass of raw eggs by heating at a temperature in the range of about 100° F. to 180° F. with substantially constant stirring until they lose their raw egg character and have reached a thick, creamy consistency, rapidly cooling the congealed egg mass to prevent further cooking, then freezing the cooled egg mass for preservation, distribution and use.

2. The method of claim 1 wherein a minor portion of solid food particles is mixed in the egg mass and the cooled egg mass is chilled to stiff semisolid consistency and stirred before freezing to insure homogeneous suspension of the solid food particles in the frozen egg mass.

3. A method for the prepartion of an egg food product adapted to be cooked without substantial loss of shape during cooking, comprising partially congealing a mass of raw eggs by heating at a temperature in the range of about 100° F. to 180° F. with substantially constant stirring until they lose their raw egg character and have reached a thick, creamy consistency, mixing a quantity of cold, raw eggs in the congealed eggs to rapidly chill the mass and stop further cooking, adding a minor portion of other food particles, and chilling the mass to stiffened consistency while stirring to insure a homogeneous mixture.

4. A method for the preparation of an egg food product adapted to be cooked without substantial loss of shape during cooking, comprising partially congealing a mass of raw eggs by heating at a temperature in the range of about 100° F. to 180° F. with substantially constant stirring until they have lost their raw egg character and have reached a thick, creamy consistency, rapidly cooling the heated mass to prevent further cooking, and homogeneously mixing from about 10 to about 100 parts by weight of methyl cellulose solution with the partially congealed egg mass.

5. The method of claim 4 wherein a minor portion of solid food particles is homegeneously dispersed in the egg mass.

6. The method of claim 4 wherein the methyl cellulose solution is a solution of methyl cellulose in milk.

7. A method for the prepartion of an egg food product, comprising partially precooking a raw egg mass by heating it to a temperature in the range of about 100° F. to 180° F. while constantly stirring until the eggs have lost their raw egg character and have reached a thick, creamy consistency, rapidly cooling the partially precooked cream mass, mixing the cooled mass with a portion of solid food particles and from about 10 to about 100% by weight of a methyl cellulose solution to obtain a homogeneous mass, and molding and freezing the resulting mass to provide a frozen food product.

8. A method for the preparation of an egg food product comprising partially precooking a portion of a raw egg mass by heating it to a temperature in the range of about 100° F. to 180° F. while constantly stirring until the eggs have lost their raw egg character and have obtained a thick, creamy consistency, rapidly cooling the thickened mass by mixing such partially precooked mass with a further portion of cold, raw eggs to prevent further cooking, mixing the resultant mass with from about 10 to about 100% by weight of methyl cellulose solution, and then freezing the mass into hard-frozen form.

9. A method for the preparation of an egg food product comprising partially precooking a portion of a raw egg mass by heating it to a temperature in the range of about 100° F. to 180° F. while constantly stirring until the eggs have lost their raw egg character and have obtained a thick, creamy consistency, rapidly cooling the thickened mass by mixing said partially precooked mass with a further portion of cold, raw eggs to stop further cooking, mixing the resulting mass with from about 10% to 100% by weight of methyl cellulose solution, adding a minor portion of solid food particles, chilling the mixture to a temperature between about 40° F. to about 32° F. to stiffen it, stirring the stiffened mass to insure homogenous suspension of the added particles, and freezing the resulting product.

10. The method of claim 9 wherein the stiffened mass is frozen in molds and the frozen, molded product is cut into portions.

11. A method for the preparation of an egg food product comprising partially precooking a portion of a raw egg mass by heating it to a temperature in the range of about 100° F. to 180° F. while constantly stirring and for a time sufficient to cause the eggs to lose their raw egg character and provide a thick, creamy consistency, mixing a further portion of cold, raw eggs with a quantity of water, rapidly chilling the thickened mass by adding the cold egg-water mixture to the precooked eggs to prevent further cooking, mixing in a minor proportion of a dry mixture of methyl cellulose powder and dry milk solids into the resulting egg mass to reconstitute the milk solids, place the methyl cellulose in solution and thicken the mass, the quantity of water mixed with the raw eggs being that sufficient to reconstitute said milk solids, and then chilling the mixture to stiffen it for further processing into desired shape.

12. The method for the preparation of an egg-milk food product adapted to be cooked without substantial change of shape, comprising partially precooking a mass of raw eggs to a temperature in the range of about 100° F. to 180° F. while constantly stirring until the eggs have lost their raw egg character and have obtained a thick, creamy consistency, rapidly cooling said eggs, mixing a dry mixture of milk solids and methyl cellulose with cold water to reconstitute the milk solids and place the methyl cellulose in solution, mixing said solution with said egg mass in minor proportion with respect to said egg mass, and chilling the mixture to stiffen it for further processing into desired shape.

13. An egg product adapted to be cooked without substantial change of shape during cooking, comprising a mass of partially cooked eggs of thick, creamy consistency and a minor portion of solid particles of other foods homogeneously admixed with a minor proportion of a solution of methyl cellulose.

14. An egg product adapted to be cooked without substantial change of shape during cooking, comprising a mass of partially cooked eggs of thick, creamy consistency and solid particles of other foods homogeneously admixed with a portion of raw eggs and a minor proportion of methyl cellulose solution.

15. An egg product adapted to be cooked without substantial change of shape during cooking, comprising a mass of partially cooked eggs of thick, creamy consistency and solid particles of other foods homogeneously admixed with a portion of raw eggs and with a solution of methyl cellulose in milk.

16. A frozen egg-base patty adapted to be cooked without substantial change in shape during cooking, comprising particles of solid food homogeneously incorporated in an intimate admixture of partially cooked eggs of thick, creamy consistency, raw eggs and a minor proportion of methyl cellulose solution.

17. The frozen egg-base patty of claim 16 wherein the solid food particles comprise a chopped meat-vegetable mixture and said methyl cellulose solution is a solution of methyl cellulose in milk.

18. An egg product adapted to be cooled without substantial change in shape during cooking, comprising a homogeneous mixture of partially cooked eggs of thick, creamy consistency, raw eggs, other food particles and methyl cellulose.

References Cited in the file of this patent

UNITED STATES PATENTS

| | | |
|---|---|---|
| 233,750 | Halvorson | Oct. 26, 1880 |
| 2,458,449 | Urbain et al. | Jan. 4, 1949 |
| 2,496,278 | Eddy | Feb. 7, 1950 |
| 2,565,311 | Koonz et al. | Aug. 21, 1951 |
| 2,798,814 | Rivoche | July 9, 1957 |
| 2,887,382 | Rivoche | May 19, 1959 |
| 2,936,240 | Kauffman et al. | May 10, 1960 |
| 2,952,551 | Long et al. | Sept. 13, 1960 |